(12) United States Patent
Shih et al.

(10) Patent No.: US 12,388,259 B2
(45) Date of Patent: Aug. 12, 2025

(54) HOUSEHOLD ENERGY MANAGEMENT AND DISPATCHING SYSTEM

(71) Applicant: NATIONAL CHUNG SHAN INSTITUTE OF SCIENCE AND TECHNOLOGY, Taoyuan (TW)

(72) Inventors: Cheng-Yu Shih, Taoyuan (TW);
Shu-Hsien Wen, Taoyuan (TW);
Shih-Chang Tseng, Taoyuan (TW);
Chih-Hsien Chung, Taoyuan (TW);
Gwo-Huei You, Taoyuan (TW);
Kuo-Kuang Jen, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 427 days.

(21) Appl. No.: 18/117,482

(22) Filed: Mar. 6, 2023

(65) Prior Publication Data

US 2024/0305098 A1 Sep. 12, 2024

(51) Int. Cl.
*H02J 3/02* (2006.01)
*G05B 15/02* (2006.01)
*G05F 1/66* (2006.01)

(52) U.S. Cl.
CPC ............... *H02J 3/02* (2013.01); *G05B 15/02* (2013.01); *G05F 1/66* (2013.01); *H02J 2203/10* (2020.01);
(Continued)

(58) Field of Classification Search
None
See application file for complete search history.

(56) References Cited

U.S. PATENT DOCUMENTS

| 2010/0019574 A1* | 1/2010 | Baldassarre | H02J 9/06 307/64 |
| 2010/0217550 A1* | 8/2010 | Crabtree | H02J 3/007 702/62 |

(Continued)

OTHER PUBLICATIONS

Kulkarni et al., "Enabling a Decentralized Smart Grid Using Autonomous Edge Control Devices", Sep. 2018, IEEE Internet of Things Journal, vol. 6, No. 5. (Year: 2018).*

(Continued)

*Primary Examiner* — Mohammad Ali
*Assistant Examiner* — Kelvin Booker

(57) ABSTRACT

A household energy management and dispatching system includes: a power generation device, converters, an energy storage device, an energy management controller, local servers and a cloud server. Each of the converters is electrically connected to the power generation device, an electricity grid, the energy storage device and the energy management controller, configured to receive a power generation electrical energy or a utility power, and transmitted to the energy storage device and a load. Each of the local servers is electrically connected to each of the converters and configured to read an electrical energy information, a utility power information and an energy storage information. The cloud server is electrically connected to the local servers. The local servers perform an edge computing analysis to obtain an edge information according to the above information. The system is used to provide a buffer to stabilize the grid and power dispatching.

8 Claims, 2 Drawing Sheets

(52) U.S. Cl.
  CPC ....... *H02J 2300/20* (2020.01); *H02J 2310/12* (2020.01)

(56) References Cited

U.S. PATENT DOCUMENTS

| | | | |
|---|---|---|---|
| 2017/0005515 A1* | 1/2017 | Sanders | H02J 3/388 |
| 2017/0025894 A1* | 1/2017 | Sanders | H02J 13/00001 |
| 2017/0155279 A1* | 6/2017 | Eckhardt | H02J 13/00034 |
| 2020/0006982 A1* | 1/2020 | Eckhardt | H02J 3/01 |

OTHER PUBLICATIONS

Hou et al., "A P2P network based edge computing smart grid model for efficient resources coordination", May 2019, Peer-to-Peer Networking and Applications (2020) 13:1026-1037. (Year: 2019).*

Li et al., "Edge-cloud Computing Systems for Smart Grid: State-of-the-art, Architecture, and Applications", Mar. 2021, Journal of Modern Power Systems and Clean Energy, vol. 10, No. 4. (Year: 2021).*

Gebbran et al., "Cloud and Edge Computing for Smart Management of Power Electronic Converter Fleets, A Key Connective Fabric to Enable the Green Transition", Oct. 2022, IEEE. (Year: 2022).*

Wang et al., "Cloud-Edge Orchestrated Power Dispatching for Smart Grid With Distributed Energy Resources", Jul. 2021, IEEE Transactions On Cloud Computing, vol. 11, No. 2, APR.-Jun. 2023. (Year: 2021).*

Wu et al., "Management and Control of Load Clusters for Ancillary Services Using Internet of Electric Loads Based on Cloud-Edge-End Distributed Computing", Feb. 2021, IEEE Internet of Things Journal, vol. 9, No. 19. (Year: 2021).*

Patel et al., "Distributed Power Apportioning with Early Dispatch for Ancillary Services in Renewable Grids", Jul. 2020, Alliance for Sustainable Energy, LLC, for the U.S. Department of Energy (DOE) under Contract No. DE-AC36-08GO28308. (Year: 2020).*

Perin et al., "Towards Sustainable Edge Computing Through Renewable Energy Resources and Online, Distributed and Predictive Scheduling", Feb. 2021, IEEE Transactions On Network and Service Management, vol. 19, No. 1. (Year: 2021).*

Chen et al., "Distributed Online Optimization of Edge Computing With Mixed Power Supply of Renewable Energy and Smart Grid", May 2021, IEEE Transactions On Communications, vol. 70, No. 1. (Year: 2021).*

Chih et al., "Implementation of EDGE Computing Platform in Feeder Terminal Unit for Smart Applications in Distribution Networks with Distributed Renewable Energies", Sep. 2022, Sustainability, 2022, 14, 13042. (Year: 2022).*

* cited by examiner

HOUSEHOLD ENERGY MANAGEMENT AND DISPATCHING SYSTEM

BACKGROUND OF THE INVENTION

1. Field of the Invention

The present disclosure relates to a management system, and in particular to a household energy management and dispatching system.

2. Description of the Related Art

In recent years, with the construction of household renewable energy, the construction of energy storage system is more and more important, the traditional technology of distributed smart grid controller is formed by the grid controller (computer or server plus power control switch) to receive a plurality of charging points of charging stations in various regions and buildings, transmits and receives the real-time information of the charging network in real time by a wired or wireless manner through a communication connection port, and stored in a storage module, and uses data computing module to electrically connect to the storage module. After generating the initial predictive charging and discharging information model according to the statistical information, an optimal charging and discharging control scheduling of the charging network is generated according to the real-time information and the initial predictive charging and discharging information model.

BRIEF SUMMARY OF THE INVENTION

However, renewable energy has the problems of intermittence and instability, and the key to solving the intermittent problem of renewable energy is to provide a buffer to stabilize the grid when renewable energy fluctuates, resulting in an imbalance between supply and demand, absorb and store excess energy when the supply exceeds demand, and provide power shortage required by the load when the demand exceeds supply. In view of the above shortcomings, the present disclosure proposes a household energy management and dispatching system to solve the above shortcomings.

In order to achieve the above objectives, a household energy management and dispatching system proposed according to the present disclosure comprises: a power generation device, a plurality of converters, an energy storage device, an energy management controller, a plurality of local servers and a cloud server. The power generation device is configured to convert a renewable energy into a power generation electrical energy. Each of the plurality of converters is electrically connected to the power generation device, an electricity grid, the energy storage device and the energy management controller, wherein each of the converters is configured to receive the power generation electrical energy converted by the power generation device or a utility power received by the electricity grid, and transmit the power generation electrical energy and the utility power to the energy storage device and a load. Each of the plurality of local servers is electrically connected to each of the converters, wherein each of the local servers is configured to read an electrical energy information of the power generation electrical energy converted by the power generation device, a utility power information of the utility power received by the electricity grid and an energy storage information of the energy storage device. The cloud server is electrically connected to the plurality of local servers. Among them, the plurality of local servers perform an edge computing analysis to obtain an edge information according to the electrical energy information, the utility power information and the energy storage information.

As the above-described household energy management dispatching system, the energy management controller is configured to control a power output of the plurality of converters, wherein the power output is an output that the plurality of converters transmit the power generation electrical energy or the utility power to the energy storage device and the load.

As the above-described household energy management dispatching system, the plurality of local servers store the electrical energy information, the utility power information and the energy storage information to the cloud server.

As the above-described household energy management dispatching system, the electrical energy information includes: a power generation input voltage, a power generation current and a power of power generation.

As the above-described household energy management dispatching system, the utility power information includes: a utility power input voltage, a utility power current, a power of utility power, a utility power frequency and an intraday cumulative power.

As the above-described household energy management dispatching system, the energy storage information includes: a battery voltage, a temperature, a charging and discharging current and a battery operating status.

As the above-described household energy management dispatching system, the cloud server comprises: a connection device, a database and a webpage interface.

As the above-described household energy management dispatching system, the connection device is electrically connected to the plurality of local servers and is used to receive the electrical energy information, the utility power information and the energy storage information, and stored to the database.

As the above-described household energy management dispatching system, the system further comprises a monitoring device, electrically connected to the cloud server, wherein the webpage interface extracts the electrical energy information, the utility power information and the energy storage information or a combination thereof from the database according to a setting parameter, and displayed through the monitoring device.

The household energy management and dispatching system of the present disclosure is mainly to achieve the efficiency of edge computing, so that the computing burden of the overall local server is reduced and the operating speed of the overall system is improved, and to make up for the problem of insufficient capacity of a single cloud server, and will carry out centralized management and control of each energy management controller, when peak power is consumed, distributed power is collected, so that the distributed power can be concentrated to achieve large-capacity dispatching, thereby alleviating the standby capacity pressure of the power plant during peak power consumption, and facilitating the balance of the overall power system.

The above summary and the following detailed description and accompanying drawings are intended to further illustrate the manner, means and effect of the present disclosure for achieving a predetermined object. Other objects and advantages of the present disclosure will be described in subsequent descriptions and drawings.

DETAILED DESCRIPTION OF THE INVENTION

The implementation of the present disclosure is described by the specific embodiments as below, those skilled in the art can easily understand the advantage and effect by the content disclosed by the present specification.

Figure 1:
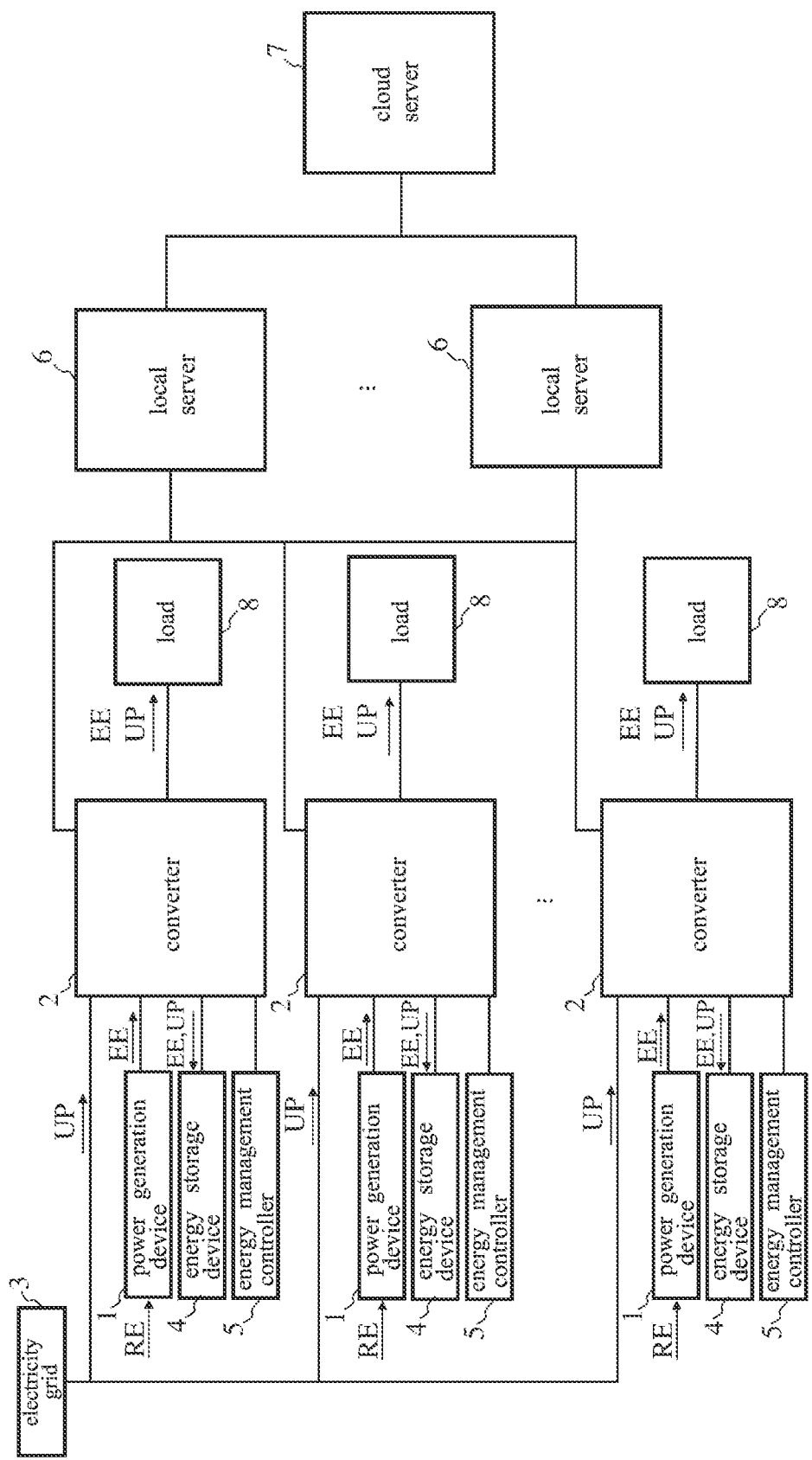
FIG. 1 is a schematic view of a household energy management and dispatching system of an embodiment of the present disclosure.

Referring to FIG. 1, FIG. 1 is a schematic view of a household energy management and dispatching system of an embodiment of the present disclosure, wherein the household energy management and dispatching system comprises a power generation device 1, a plurality of converters 2, an electricity grid 3, an energy storage device 4, an energy management controller 5, a plurality of local servers 6 and a cloud server 7, wherein the power generation device 1 is configured to convert a renewable energy RE into a power generation electrical energy EE, the renewable energy RE includes solar power generation, wind power generation, geothermal power generation, biomass power generation and waste power generation, etc., the above-mentioned renewable energy RE is not limited to the disclosure of the present embodiment. Among them, the power generation device 1, for example, may be solar photovoltaic panels, small wind turbines, geothermal generators, biomass generators, etc. The energy storage device 4 may be a repetitive charging and discharging battery module. The energy management controller 5 may be an electronic device with a processor, an industrial computer, a commercially available energy management controller with a human-machine interface editable program, etc. The local server 6 may be servers, computers, industrial computers, etc. The cloud server 7 may be servers, server sets, industrial computers, etc.

Each the converter 2 is connected to the power generation device 1, the electricity grid 3, the energy storage device 4 and the energy management controller 5, wherein each the converter 2 is configured to receive the power generation electrical energy EE converted by the power generation device 1 or the utility power UP received by the electricity grid 3, and transmit the power generation electrical energy EE and the utility power UP to the energy storage device 4 and a load 8. Each the local server 6 is configured to electrically connect each the converter 2. The cloud server 7 is configured to electrically connect the plurality of local servers 6. Among them, the local server 6 may be electrically connected to the converter 2 via an RS485 standard. The load 8 may be electronic devices that require electric energy in households, household distribution boxes, household sockets, etc. In one embodiment, the local server 6 may be located indoors. In one embodiment, the local server 6 may be shared by several households.

In one embodiment, each the local server 6 is configured to read an electrical energy information EEI of the power generation electrical energy EE converted by the power generation device 1, a utility power information UPI of the utility power UP received by the electricity grid 3 and an energy storage information SEI of the energy storage device 4. The plurality of local servers 6 perform an edge computing analysis to obtain an edge information according to the electrical energy information EEI, the utility power information UPI and the energy storage information SEI, wherein the edge computing analysis performs decomposition, cutting and arrangement of information to the electrical energy information EEI, the utility power information UPI and the energy storage information SEI, and then obtains decomposition information, cutting information and arrangement information, and analyzes the decomposition information, the cutting information and the arrangement information to obtain the edge information. Among them, the edge analysis performed by the plurality of local servers 6 can reduce the computing burden of the overall local server, and the data (such as electrical energy information EEI, utility power information UPI and energy storage information SEI) can be processed and analyzed at local side in real time through the distributed processing architecture of the plurality of local servers 6, thereby improving the operating speed of the overall system, while making up for that a single cloud server may encounter the problems of insufficient capacity, long transmission time, and excessive data concentration to reduce computing performance, in order to achieve fast energy monitoring and dispatching in real-time and stabilize the power grid.

In one embodiment, the energy management controller 5 is configured to control a power output that the converters 2 transmit the electrical energy EE or the utility power UP to the energy storage device 4 and the load 8. In one embodiment, according to the edge information of edge computing, by controlling the power output from the electrical energy EE or the utility power UP transmitted to the energy storage device 4 and the load 8, the effect of dispatching household energy and effectively managing the dispatched energy can be achieved.

In one embodiment, the plurality of local servers 6 store the electrical energy information EEI, the utility power information UPI and the energy storage information SEI to the cloud server 7. It enables the plurality of local servers 6 and the cloud server 7 to complement each other to provide preferable performance for applications and computing. Further, in one embodiment, the data collected and processed by the plurality of local servers 6 is connected to a remote cloud server 7 through a network, and the household energy usage data of a plurality of households or multiple communities can be processed through the plurality of local servers 6, and respectively transmitted to the cloud server 7, which is monitored and dispatched by the cloud server 7 to form a monitoring and dispatching of the overall power grid.

In one embodiment, the electrical energy information EEI includes power generation input voltage, power generation current and power of power generation, the utility power information UPI includes utility power input voltage, utility power current, power of utility power, utility power frequency and an intraday cumulative power, the energy storage information SEI includes a battery voltage, a temperature, a charging and discharging current and a battery operating status, and the above electrical energy information EEI, utility power information UPI and energy storage information SEI are not limited to the disclosure of the present embodiment. In this way, the energy management and dispatching of households can be further optimized according to different external environments and different power generation and utility power conditions.

Figure 2:
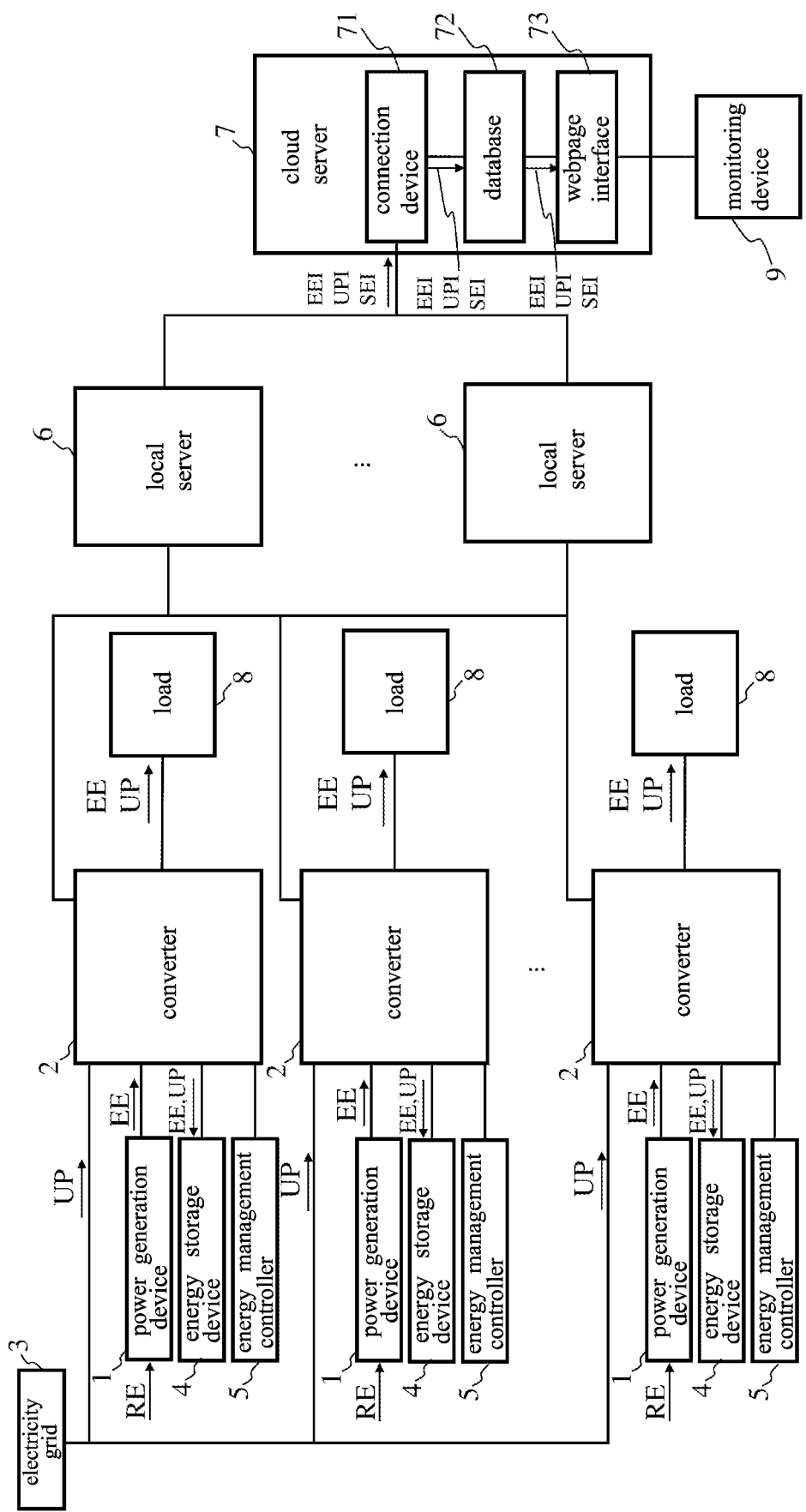
FIG. 2 is a schematic view of a household energy management and dispatching system of another embodiment of the present disclosure.

Referring to FIG. 2, FIG. 2 is a schematic view of a household energy management and dispatching system of another embodiment of the present disclosure. Among them, the cloud server 7 further comprises a connection device 71, a database 72 and a webpage interface 73. The connection device 71 is electrically connected to the plurality of local servers 6 and is used to receive the electrical energy information EEI, the utility power information UPI and the energy storage information SEI, and store the electrical energy information EEI, the utility power information UPI and the energy storage information SEI to the database 72. The webpage interface 73 is configured to extract the electrical energy information EEI, the utility power information UPI and the energy storage information SEI or a combination thereof from the database 72 according to the needs or setting parameters of users, and displayed on a monitoring device 9 electrically connected to the webpage interface 73, so that the operator can monitor the information through the monitoring device 9. Among them, the connection device 71 may be a data online transmission device such as a wired network, wireless network and Bluetooth, and a protocol. The database 72 may be a storage medium such as a hard disk, memory, solid-state disk and memory card. The webpage interface 73 may be an operating interface built from HTML (HyperText Markup Language), XML (Extensible Markup Language), Java Script, CSS (Cascading Style Sheets), etc. The monitoring device 9 may be electronic devices, mobile devices, wearable devices, mobile phones, smart watches, computers, laptops, tablets, monitors, display panels, projection lights, audio devices, etc. In this way, the user or operator of the household energy management and dispatching system can quickly and easily monitor the relevant electric power information of the electrical energy information EEI, the utility power information UPI and the energy storage information SEI through the monitoring device 9 at any time.

To be described, the foregoing description is only preferable embodiments of the present invention, not to limit the present invention, if the changes made according to the conception of the present invention are not departing from the scope and spirit of the present invention, such as: the transformation of the configuration or arrangement, various changes, modifications and applications, the equivalent effects produced shall be included in the scope of the invention that must be explained.

What is claimed is:

1. A household energy management and dispatching system, comprising:
   a power generation device, the power generation device is configured to convert a renewable energy into a power generation electrical energy;
   a plurality of converters, each of the plurality of converters is electrically connected to the power generation device, an electricity grid, an energy storage device, an energy management controller and a load, wherein each of the plurality of converters is configured to receive the power generation electrical energy converted by the power generation device or a utility power received by the electricity grid, and transmit the power generation electrical energy and the utility power to the energy storage device and the load;
   a plurality of local servers, each of the plurality of local servers is electrically connected to each of the converters, wherein each of the plurality of local servers is configured to read an electrical energy information of the power generation electrical energy converted by the power generation device, a utility power information of the utility power received by the electricity grid and an energy storage information of the energy storage device; and
   a cloud server, the cloud server is electrically connected to the plurality of local servers, wherein the plurality of local servers perform an edge computing analysis to obtain an edge information according to the electrical energy information, the utility power information and the energy storage information, and wherein the energy management controller is configured to control a power output that the plurality of converters transmit, the power generation electrical energy, or the utility power to the energy storage device and the load.

2. The household energy management and dispatching system according to claim 1, wherein the energy storage information includes: a battery voltage, a temperature, a charging and discharging current and a battery operating status.

3. The household energy management and dispatching system according to claim 1, wherein the plurality of local servers store the electrical energy information, the utility power information and the energy storage information to the cloud server.

4. The household energy management and dispatching system according to claim 1, wherein the electrical energy information includes: a power generation input voltage, a power generation current and a power of power generation.

5. The household energy management and dispatching system according to claim 1, wherein the utility power information includes: a utility power input voltage, a utility power current, a power of utility power, a utility power frequency and an intraday cumulative power.

6. The household energy management and dispatching system according to claim 1, wherein the cloud server comprises: a connection device, a database and a webpage interface.

7. The household energy management and dispatching system according to claim 6, wherein the connection device is electrically connected to the plurality of local servers and is used to receive the electrical energy information, the utility power information and the energy storage information, and stored to the database.

8. The household energy management and dispatching system according to claim 7, further comprising a monitoring device, electrically connected to the cloud server, wherein the webpage interface extracts the electrical energy information, the utility power information and the energy storage information or a combination thereof from the database according to a setting parameter, and displayed through the monitoring device.

* * * * *